United States Patent [19]
Tevis

[11] 3,807,093
[45] Apr. 30, 1974

[54] ELONGATED FLEXING ROD MEANS

[75] Inventor: Felix H. Tevis, South Pasadena, Calif.

[73] Assignee: Lockheed Aircraft Corporation, Burbank, Calif.

[22] Filed: Apr. 5, 1973

[21] Appl. No.: 348,233

[52] U.S. Cl............... 49/501, 49/34, 49/420, 49/425, 16/97
[51] Int. Cl............................................. E06b 3/00
[58] Field of Search ............. 49/501, 420, 425, 34; 16/97, 98; 160/201

[56] References Cited
UNITED STATES PATENTS

| | | | |
|---|---|---|---|
| 3,037,555 | 6/1962 | Kochanowski | 16/97 X |
| 3,113,353 | 12/1963 | Tucknott | 49/34 |
| 3,241,197 | 3/1966 | Gogerty | 49/425 X |

Primary Examiner—Kenneth Downey
Attorney, Agent, or Firm—Billy G. Corber; Frank L. Zugelter

[57] ABSTRACT

A device to absorb a load applied to a cam roller mounted on a door. The device comprises an elongated rod having a cam roller mounted at its one end a relatively short distance from which a spherical bearing is mounted in a structural edge member for the door. The other end of the elongated rod is radially tethered at a great distance from the spherical bearing in a similar door structural member while sliding axially free of such member. When a generally radially directed load is applied to the cam roller, the elongated portion of the rod between such structural members bows or flexes between these two supports, therey minimizing transmission of any shock load applied to the roller to and through the surrounding door and its supporting structure.

3 Claims, 5 Drawing Figures

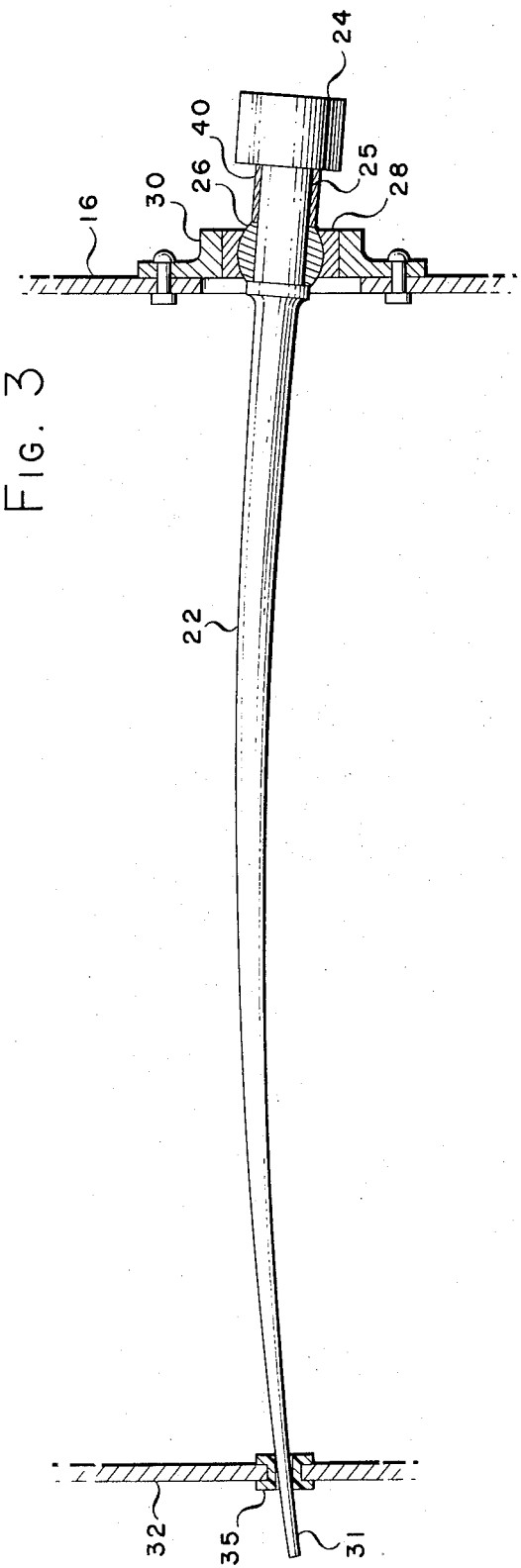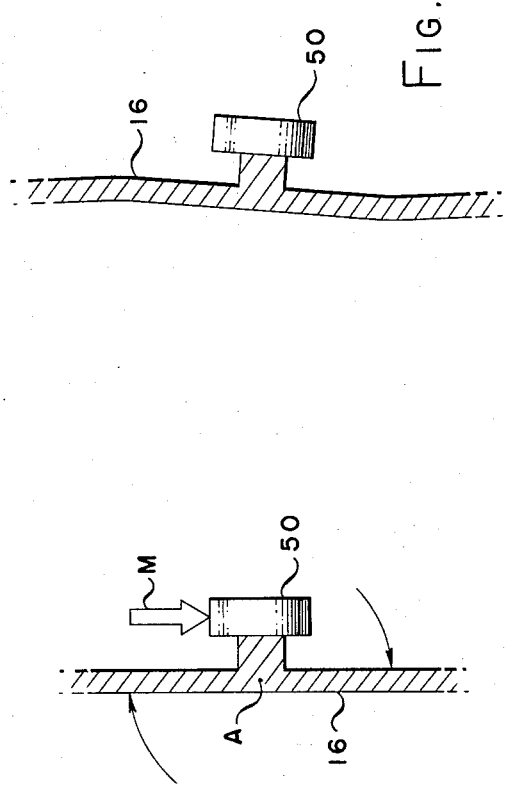

ELONGATED FLEXING ROD MEANS

BACKGROUND OF THE INVENTION

1. FIeld of the Invention

The field of art to which the invention is most likely to pertain is located in a class of devices generally relating to shock absorption of loads.

2. The Prior Art

Examples of prior art devices in the arts to which this invention most likely pertains are U.S. Letters Pat. Nos. 285,984; 1,776,261; 2,036,636; 2,540,832; 2,727,780; 2,938,973; 2,943,863; 2,997,261; and 3,176,509.

3. Problems in the Prior Art

In the assembly of a cargo door to its mated position in an opening of the fuselage of an aircraft, a plurality of studs or cam rollers are mounted along the edges of the door for cooperation with slots provided in the fuselage along the opening. These studs or cam rollers are subject to shock and impact loads, such as occur upon closing the cargo door and during flight mode when vibrational loads are transmitted to the cargo door from the fuselage. Bending moments are introduced in sufficient magnitude to the door structure adjacent to the fixed stud or cam roller such that a beefed-up supporting structure has been required in the assembly of the door, with the disadvantage of added weight to the aircraft. Maintenance and assembly reliability is necessarily curtailed, because of excessively high spring rate under small variations in cam roller excursions.

This invention solves the added weight problem in addition to providing better reliability leading to longer life and ease of installation and adjustment of the subject matter of the invention.

SUMMARY OF THE INVENTION

This invention relates to shock or impact absorbing devices, and in particular, relates to an elongated flexible rod means capable of bowing or flexing to absorb cam roller loads applied thereto and adjacent a door or the like to which it is mounted.

An object of this invention is to relieve a cam roller load on a door or the like.

Another object of this invention is to reduce the weight otherwise needed for supporting devices which would absorb a load, particularly in an environment, such as an aircraft, where the matter of weight is critical and it is desirous to keep it at a minimum with regard to utilization of structural elements therein.

Another object of this invention is to eliminate bending moments in a door structure adjacent to a cam roller provided for locking purposes with corresponding parts of the surrounding structure.

Another object of this invention is to provide greater motion capability for a cargo door on an aircraft relative to its fuselage-mounted structure without increasing aircraft weight, while minimizing or eliminating the introduction of bending moments into the door structure.

Another object of this invention is to provide self-alignment of a cam roller on a door to a locking cam slot on adjacent frame structure during the opening and closing of the door.

These and other objects and advantages will become more apparent upon a full and complete reading of the following description, the appended claims thereto, and the accompanying drawing comprising two sheets.

BRIEF DESCRIPTION OF THE DRAWING

FIG. 3 is an enlarged view of a portion of FIG. 1; however, modified to show the rod being bowed or flexed under a load.

FIGS. 4 and 5 illustrate a failure to a mounting structure having merely a cam roller or stud thereon and not including the instant invention.

DESCRIPTION OF THE PREFERRED EMBODIMENT

Figure 1:
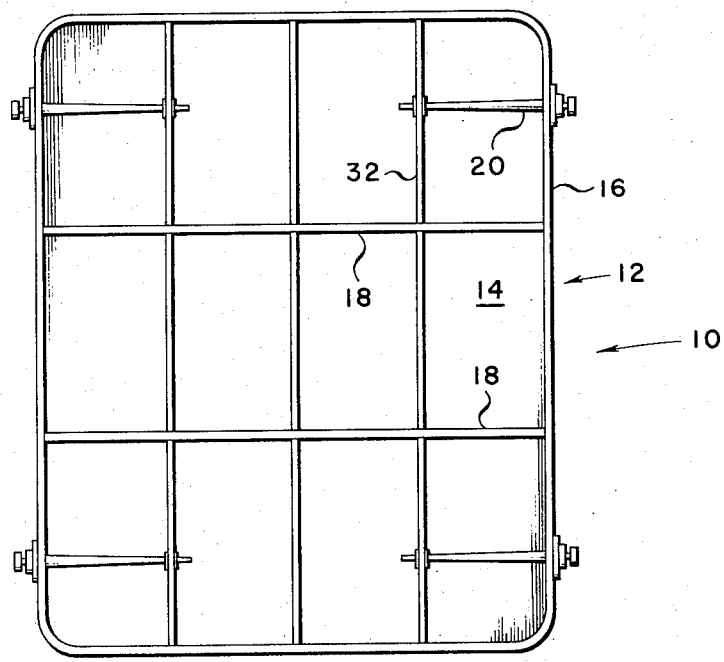
FIG. 1 is an interior elevational view of a cargo door on which the subject matter of this invention is capable of being mounted.

Referring now to the drawing in which reference characters correspond to like numerals hereinafter, the numeral 10 refers generally to the environment in which the invention is adaptable. The environment 10 discloses a door 12, such as a cargo door adapted for mating with a fuselage of an aircraft (not shown). Such cargo doors are generally quite large in width and height, and are of a considerable mass or weight. The door 12 comprises a wall 14 suitably mounted on formers 16 and stringers 18, all of which may be fabricated and assembled in known or conventional fashion. The subject matter of this invention as adapted to a cargo door 12, is identified by the reference character 20, and a suitable number of them are mounted to the door at appropriate hard points at which specified portions of the door physically bear against its surrounding frame.

The device 20 (FIGS. 2,3) comprises an elongated rod 22, a cam roller 24 mounted at its one end 25 a relatively short distance from a spherical bearing 26 socketed in a ring 28 securely mounted to a bearing plate 30 secured to a support member or former 16, and having its other end 31 slidingly mounted in a second support member or former 32 at a great distance from the spherical bearing 26. The former 16 is disposed along the edge of the door in order to orient the cam roller 24 relative to a cam slot (not shown) included in the frame to which the door 12 is mounted. A suitable bushing 35 is provided the second former 32 in an aperture formed therein for slidingly supporting the end 31 of the elongated rod 22. The extremity 31 is in effect tethered to the former 32 in that it is limited in any radial movement coincident with the axis of that former, but is free to slide to-and-fro through the bushing 35.

A spacer 40 is provided on the end 25 of the rod 22 between the cam roller 24 and the spherical bearing 26, for proper installation.

Figure 2:
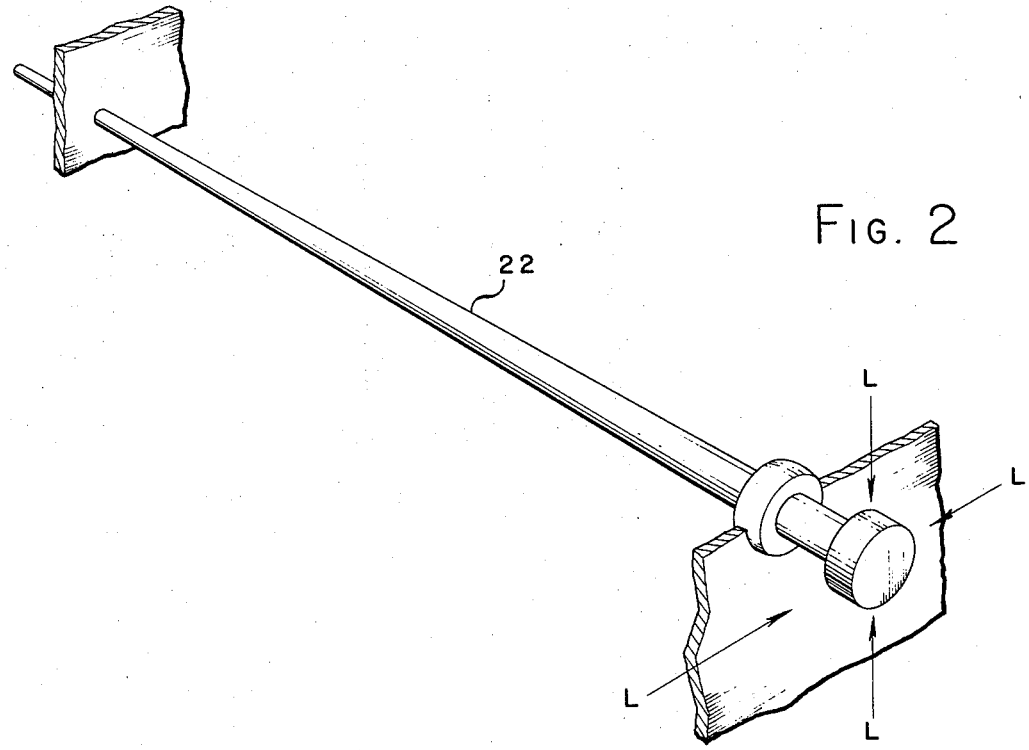
FIG. 2 is a perspective view of the elongated flexing rod means and mounting structure therefor which embodies the invention.

When the cam roller encounters a load, as shown by one of the arrows L in FIG. 2, a rod L is generally radially directed thereagainst. Rather than the former 16 absorbing such load, the elongated portion of the rod 22 between the formers 16, 32 flexes or bows to absorb such loading force L. The spherical bearing 26 rotates within its ring 28, while the rod end 31 is free to move in an axial direction correlated to the degree of flexing or bowing that the rod 22 undergoes along its length. The end 31 must, of course, sufficiently project past the former 32 to not escape the support of the former 32 for the greatest degree of flexing for the rod 22.

FIGS. 4 and 5 illustrate what would occur to a former 16 were a cam roller or stud 50 mounted directly thereto. As a radial load M would be applied to the cam roller or stud 50, a bending moment about the axis A would be induced, and as shown by the direction of the arrows in FIG. 4. A resulting effect is shown in FIG. 5, wherein the former 16 has buckled out of its plane. This invention solves this buckling problem while simultaneously providing the advantage of weight saving over what additional supporting structure would be required for the former 16 to prevent it from buckling.

The diameter of the rod 22 can be ascertained upon knowing the length through which flexing is to occur without the rod's material reaching its stress level that would destroy the efficacy or utilization of the subject matter of the invention.

The further advantage realized in this invention is the self-aligning characteristic of the cam roller 24 to its associated cam slot (not shown) on the door's frame. The rod 22 is capable of flexing under the physical impact between the cam roller 24 and its cooperating slot, thereby absorbing the shock. Ordinarily, a prying action occurs when opening the door and which imposes loads on the bearing points of the cargo door to, say, a structural frame on an aircraft. The loads are concentrated on the cam slot affixed to the aircraft structure. The invention minimizes or eliminates transmission of such loads into the door, during opening, closing, or actual flying modes.

Also, the door 12 itself may be fabricated with less material; i.e., being of a thinner wall construction, when this invention is mounted thereto.

The rod 22 may be made of a suitable material, such as a heat-treated steel or aluminum. The cam roller 24 may be made of like or other suitable material, and press fit to the end of the rod.

Pursuant to the requirements of the patent statutes, the principle of this invention has been explained and exemplified in a manner so that it can be readily practiced by those skilled in the art to which it pertains, or with which it is most nearly connected, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what I claim as patentably novel is:

1. An elongated flexing rod means for absorbing loads applied to a locking feature on a door or the like which cooperates with a corresponding feature on the frame for the door or the like, comprising in combination, an elongated rod having ends, a roller mounted on one of its ends, a spherical bearing mounted on said rod at a relatively short distance from said one of its ends, and a pair of spaced support members, said spherical bearing mounted in the first of said support members, and the other of said rod's ends being tethered to and slidingly supported at the second of said support members at a great distance from said spherical bearing relative to the aforementioned short distance.

2. The rod means of claim 1 including a spacer mounted on said rod between said roller and spherical bearing.

3. The rod means of claim 1 in combination with a door, said support members constituting spaced structural elements forming the assembly of the door.

* * * * *